United States Patent
Ressler et al.

(10) Patent No.: US 12,460,823 B2
(45) Date of Patent: Nov. 4, 2025

(54) GAS FIRE PIT WITH REPELLENT CAPABILITIES

(71) Applicant: Lamplight Farms Incorporated, Menomonee Falls, WI (US)

(72) Inventors: Kyle Ressler, West Bend, WI (US); Lucas Henry Zeitler, Wauwatosa, WI (US); Andrew Alan Harmeling, Milwaukee, WI (US); Ben Yu, New Berlin, WI (US)

(73) Assignee: Lamplight Farms Incorporated, Menomonee Falls, WI (US)

( * ) Notice: Subject to any disclaimer, the term of this patent is extended or adjusted under 35 U.S.C. 154(b) by 547 days.

(21) Appl. No.: 17/824,032

(22) Filed: May 25, 2022

(65) Prior Publication Data

US 2022/0390119 A1    Dec. 8, 2022

Related U.S. Application Data

(60) Provisional application No. 63/197,151, filed on Jun. 4, 2021.

(51) Int. Cl.
| | | |
|---|---|---|
| *F24C 3/00* | (2006.01) | |
| *A01N 25/18* | (2006.01) | |
| *A01P 17/00* | (2006.01) | |
| *F24C 3/08* | (2006.01) | |

(52) U.S. Cl.
CPC ............. *F24C 3/002* (2013.01); *A01N 25/18* (2013.01); *A01P 17/00* (2021.08); *F24C 3/082* (2013.01)

(58) Field of Classification Search
CPC ............. A01M 1/2055; A01M 1/2044; A01M 1/2061; A01M 1/2072; F24C 3/002; F24C 3/082; A01P 17/00; A01N 25/18
See application file for complete search history.

(56) References Cited

U.S. PATENT DOCUMENTS

| | | | |
|---|---|---|---|
| 6,301,194 B1 * | 10/2001 | Cauchy | A01M 29/18 119/719 |
| 2012/0196232 A1 | 8/2012 | Miller | |
| 2017/0238523 A1 * | 8/2017 | Wang | A61L 9/03 |

FOREIGN PATENT DOCUMENTS

| | | | | |
|---|---|---|---|---|
| CN | 203323191 U | | 12/2013 | |
| EP | 1424005 A1 | * | 6/2004 | ........ A01M 1/2066 |
| FR | 2537394 | * | 6/1984 | |
| KR | 200158935 | * | 10/1999 | |

* cited by examiner

*Primary Examiner* — Alfred Basichas
(74) *Attorney, Agent, or Firm* — Gablegotwals; David G. Woodral (57) ABSTRACT

A fire pit has a gas burner and a repellent container. The gas burner provides energy that volatilizes repellent from the repellent container.

8 Claims, 10 Drawing Sheets

FIG. 10

GAS FIRE PIT WITH REPELLENT CAPABILITIES

CROSS-REFERENCE TO RELATED CASES

This application claims the benefit of U.S. provisional patent application Ser. No. 63/197,151, filed on Jun. 4, 2021, and incorporates such provisional application by reference into this disclosure as if fully set out at this point.

FIELD OF THE INVENTION

This disclosure relates to insect repellent devices in general and, more particularly, to a gas fire pit with insect repellent capabilities.

BACKGROUND OF THE INVENTION

Outdoor fire pits are popular recreational items allowing consumers to enjoy the appearance and ambiance of a fire on demand. Gas fire pits allow for near instantaneous starting of the fire and the fire may be extinguished on demand. Opportunities also exist for integration of gas fire pit devices in to tables and other furniture.

Enjoyment of the outdoors in most parts of the world, in the warmer times of year, frequently results in the need to deal with flying and biting insects. Various repellents known to the art can be used. These may require application of repellents to an individual or use of an area wide repellent. This means a step is required separate and apart from starting or kindling the fire pit to enjoy the outdoors.

What is needed is a system and method for addressing the above, and related, issues.

SUMMARY OF THE INVENTION

The invention of the present disclosure, in one aspect thereof, comprises a fire pit with a gas burner, and a container having a repellent therein. Heat from the propane burner is used to volatize the repellent from the container using heat from the propane burner.

The fire pit may include a heat exchanger transporting heat from the gas burner to the container. The container may further comprises a repellent reservoir and a wick extending into the reservoir from outside the reservoir. An electric fan may disperse the volatilized repellent. The fire pit may have a thermoelectric generator heated by the propane burner to generate electricity powering the fan.

The invention of the present disclosure, in another aspect thereof, comprise a fire pit with a gas burner and a repellent container. The gas burner provides energy that volatilizes repellent from the repellent container.

In some embodiments, the gas burner volatilizes the repellent by direct heating. In some cases the fire pit has a heat pipe that moves heat from the burner to the repellent to volatilize the repellent.

The fire pit may further comprise a thermoelectric generator, and a resistive heater. In such case, the thermoelectric generator generates electric power by exposure to the gas burner. The electric power from the thermoelectric generator powers the resistive heater to disperse the repellent. The fire pit may further comprise a fan powered by the thermoelectric generator to disperse the volatilized repellent. The fire pit may also comprise a cabinet having an air passage therein that receives the volatilized repellent from the container for dispersal by the fan.

The invention of the present disclosure, in another aspect thereof, comprises a fire pit with a cabinet having a fire pit burner and a repellent pod containing an insect repellent, the repellent pod affixed with respect to the cabinet to disperse repellent from the cabinet.

In some cases, the burner directly heats the repellent pod thereby volatilizing the insect repellent for dispersal. In other embodiments, the fire pit comprises a heat exchanger that moves heat from the burner to the repellent pod and volatilizes the repellent. The fire pit may have an electric heating element that volatilizes repellent from the repellent pod. The fire pit may comprise a battery for powering the electric heating element. A solar panel may power the electric heating element. In other embodiments, the fire pit further comprises a thermoelectric generator powering the electric heating element using heat from the burner.

Some embodiments further comprise an auxiliary burner that heats the insect repellent thereby volatilizing the insect repellent. The repellent pod may comprise a reservoir containing liquid repellent and a wick that disperses volatilized repellent.

DETAILED DESCRIPTION OF THE PREFERRED EMBODIMENTS

Figure 1:
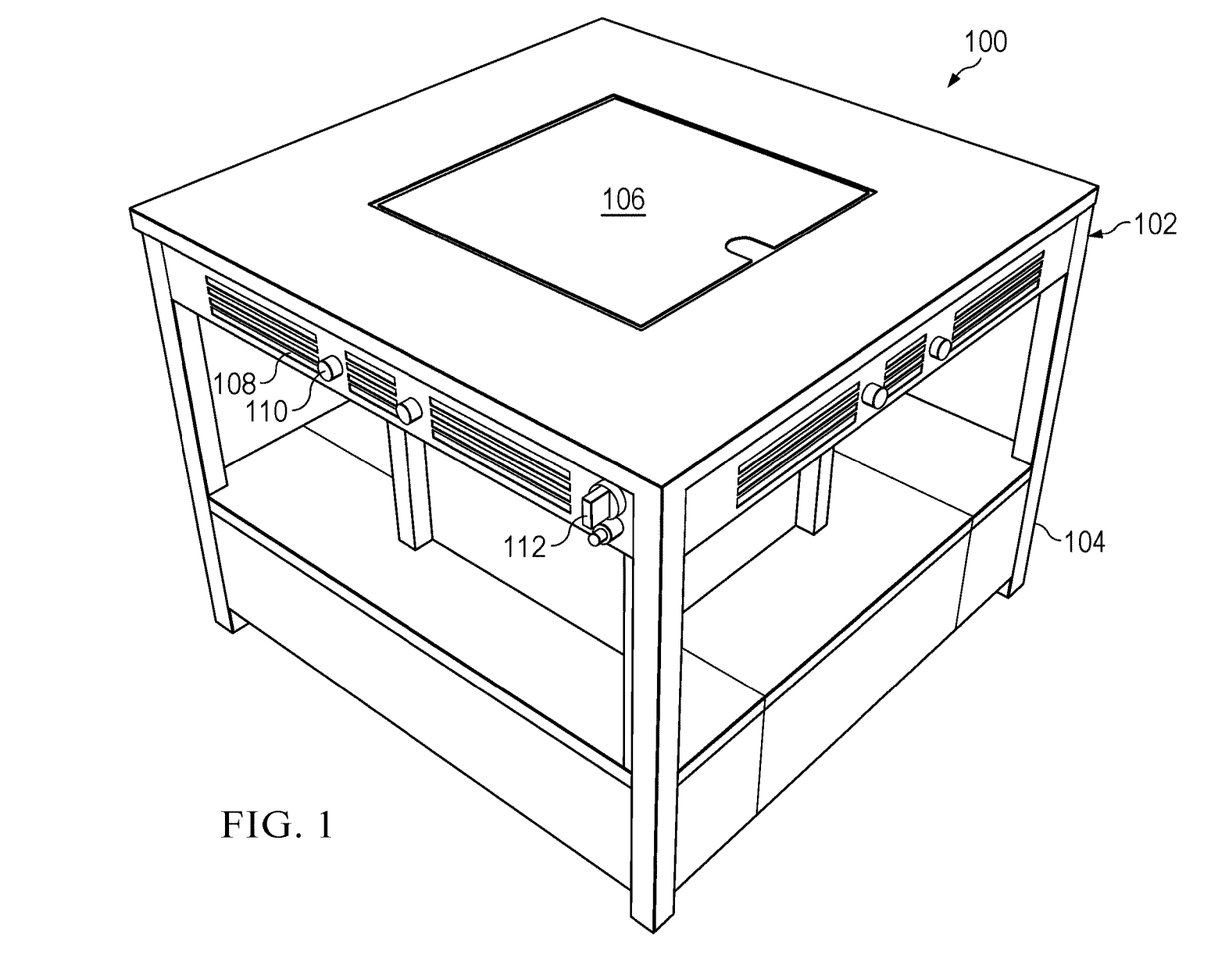
FIG. 1 is perspective view of one embodiment of a gas fire pit with repellent capabilities according to aspects of the present disclosure.

Referring now to FIG. 1, a perspective view of a gas fire pit 100 with repellent capabilities according to aspects of the present disclosure is shown. Fire pits according to the present disclosure provide fire, light, and/or other functions in conjunction with repellent dispersion capabilities. Fire pit 100 has a cabinet or body 102, the appearance of which may vary. As shown, the cabinet 102 has a base 104 that provides for secure mounting and utilization of one or more propane tanks, gas connections, fans, wiring, generators, burners and other components (not shown). The cabinet 102 may provide vents 108 with adjustment mechanisms 110. External controls 112 may include knobs, button sliders, and other mechanism allowing the user to access functions of the gas fire pit. A top cover 106 may be provided for covering an internal burner when not in use.

Figure 2:
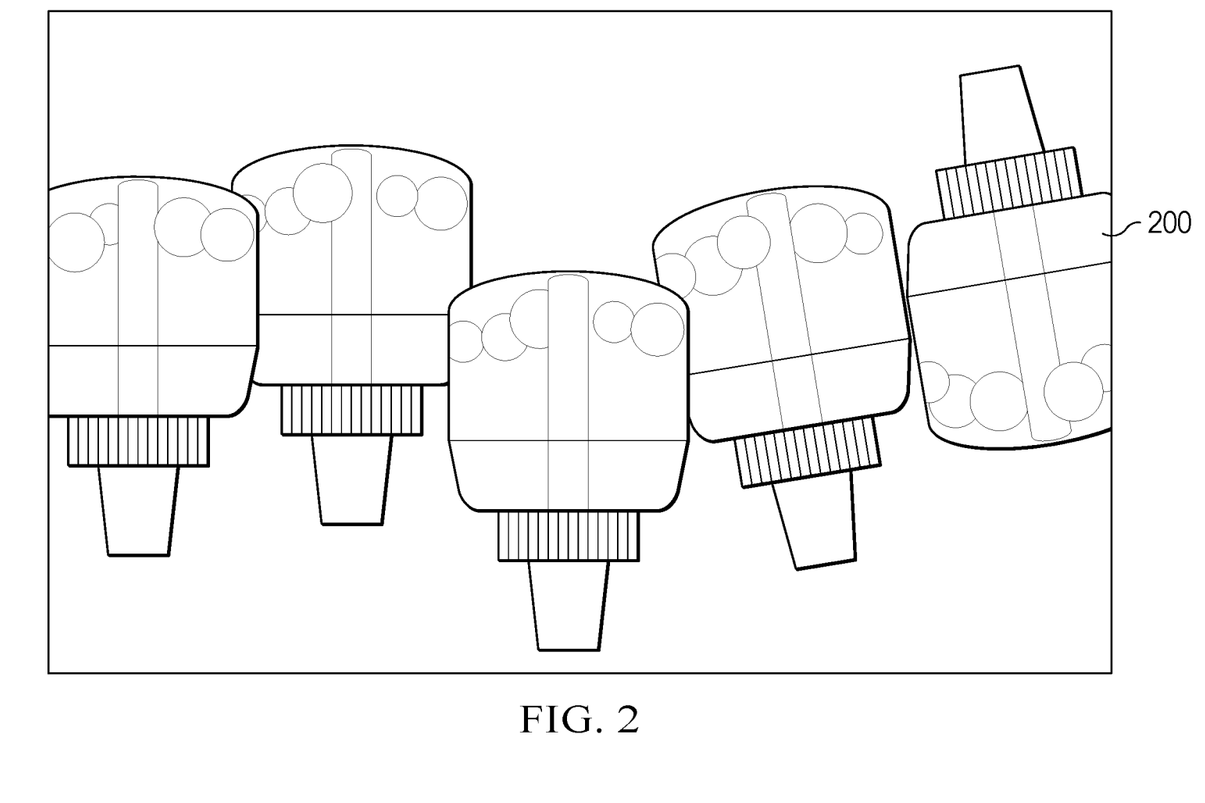
FIG. 2 is a perspective view of a plurality of repellent pods according to aspects of the present disclosure.

FIG. 2 is a perspective view of a plurality of repellent pods 200 according to aspects of the present disclosure. Repellent pods 200 represent only one of multiple ways that the fire pits 100 of the present disclosure may retain repellents prior to and during dispersion or distribution. Such pods 200 may have a reservoir and a wicking mechanism for providing evaporation of the repellent which may increase under air flow and/or heating. Gel packs, gel pods, mats, liquid reservoirs of various kinds and other devices may be utilized to retain and disperse repellents in accordance with the present disclosure. It should be understood that systems of the present disclosure may be used with various repellents and repellent compositions as are known in the art. These may or may not include pyrethrin or pyrethroids.

Figure 3:
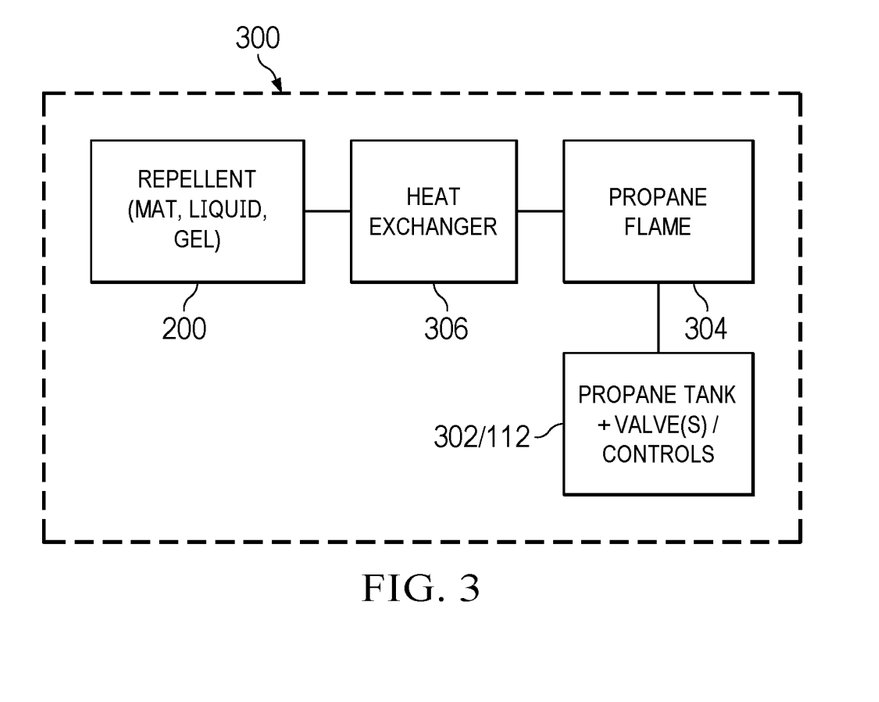
FIG. 3 is a block system diagram of a gas fire pit with repellent capabilities according to aspects of the present disclosure.

FIG. 3 is a block system diagram of a gas fire pit 300 with repellent capability according to aspects of the present disclosure. Physical appearance of the fire pit 300 may be the same or similar to fire pit 100 or different. An internal propane tank 302 and controls 112 provide for operation of a propane flame 304 (utilizing burners as are known in the art). A heat exchange mechanism 306 (e.g., such as are known in the art) may move and/or regulate heat from the flame 304 to the repellent pod 200 (or other repellent retention/reservoir mechanism).

Figure 4:
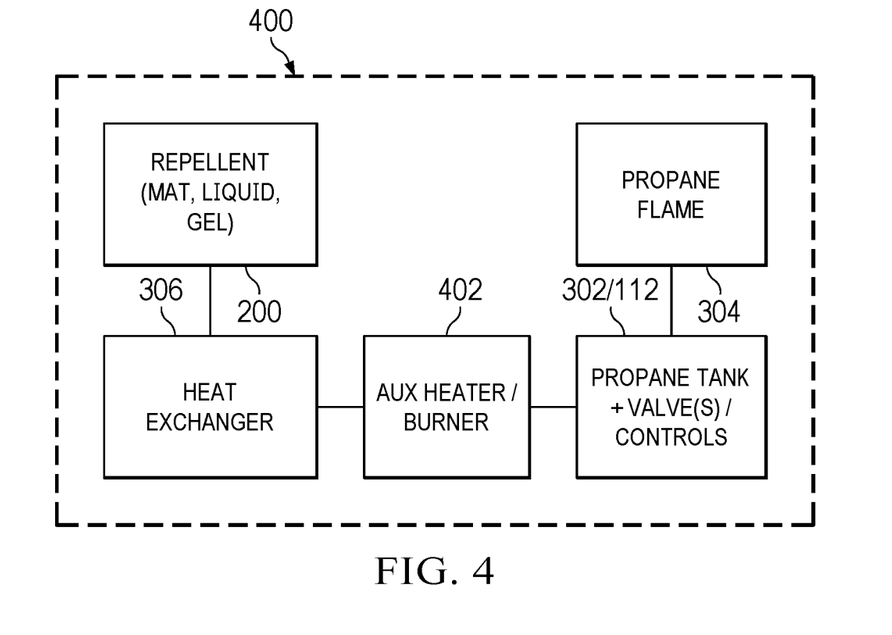
FIG. 4 is a block system diagram of another gas fire pit with repellent capabilities according to aspects of the present disclosure.

FIG. 4 is a block system diagram of another gas fire pit 500 with repellent capability according to aspects of the present disclosure. Similarities to fire pit 300 can be seen. Here, however, the propane flame 304 is not used to heat repellent, but rather a separate auxiliary burner/heater 402 is employed. This may be fueled and controlled by the same propane tank 302 and controls 112, respectively, as the propane flame 304. Heat may be transported and/or regulated for delivery to the repellent pod 200 (or other repellent retention/reservoir mechanism) by heat exchanger 306.

Figure 5:
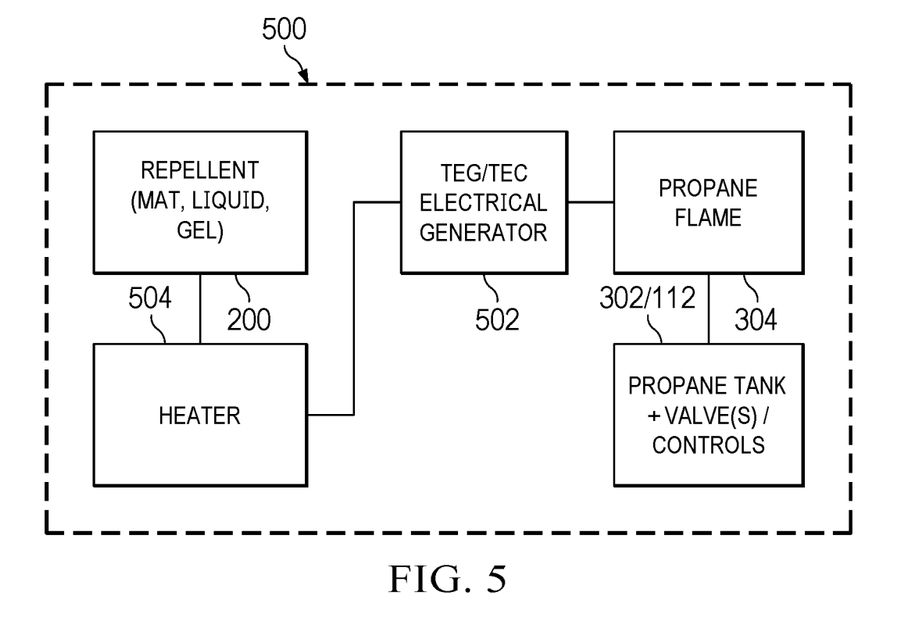
FIG. 5 is a block system diagram of another gas fire pit with repellent capabilities according to aspects of the present disclosure.

FIG. 5 is a block system diagram of another gas fire pit 500 with repellent capabilities according to aspects of the present disclosure. Again, there is some similarity of components with fire pit 300. However, here the propane flame 304 is used to generate electrical power using a thermoelectric generator 502 (such as those available from Tecteg of Aurora, Ontario, Canada). Power from the generator 502 is used to operate an electric heater 504, which heats the repellent pod 200 (or other repellent retention/reservoir mechanism). Control of the generator 502 and/or heater 504, if needed, may be provided via controls 112.

Figure 6:
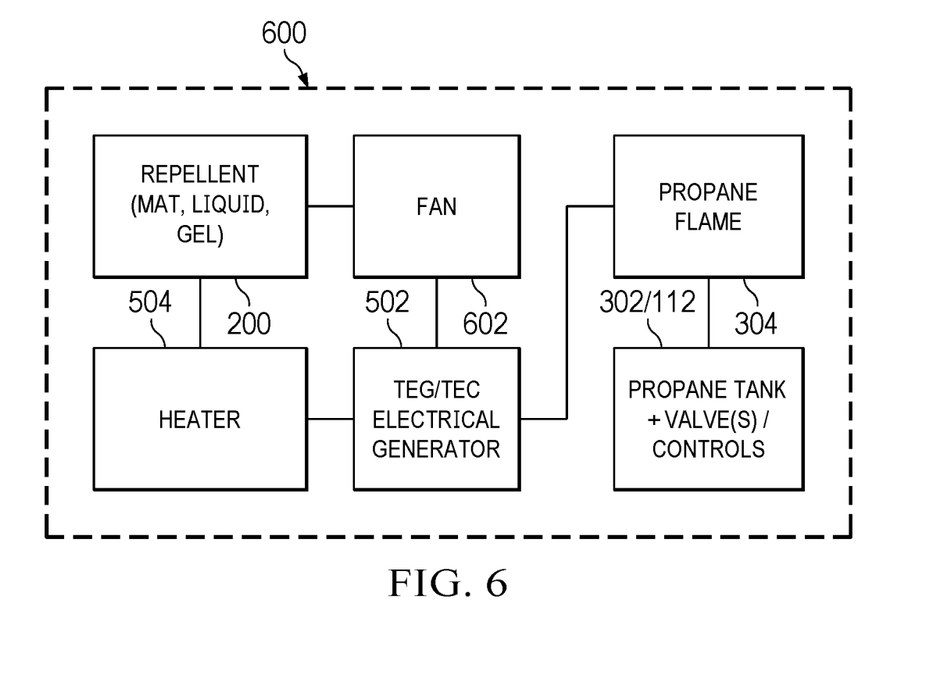
FIG. 6 is a block system diagram of another gas fire pit with repellent capabilities according to aspects of the present disclosure.

FIG. 6 is a block system diagram of another gas fire pit 600 with repellent capabilities according to aspects of the present disclosure. The fire pit 600 is similar to the fire pit 500 but adds a fan 602 that may be used in conjunction with or separately from the heater 504 to increase or control dispersion of repellent. The fan 602 may be powered by the thermoelectric generator 502 and may be controlled using controls 112 or others.

Figure 7:
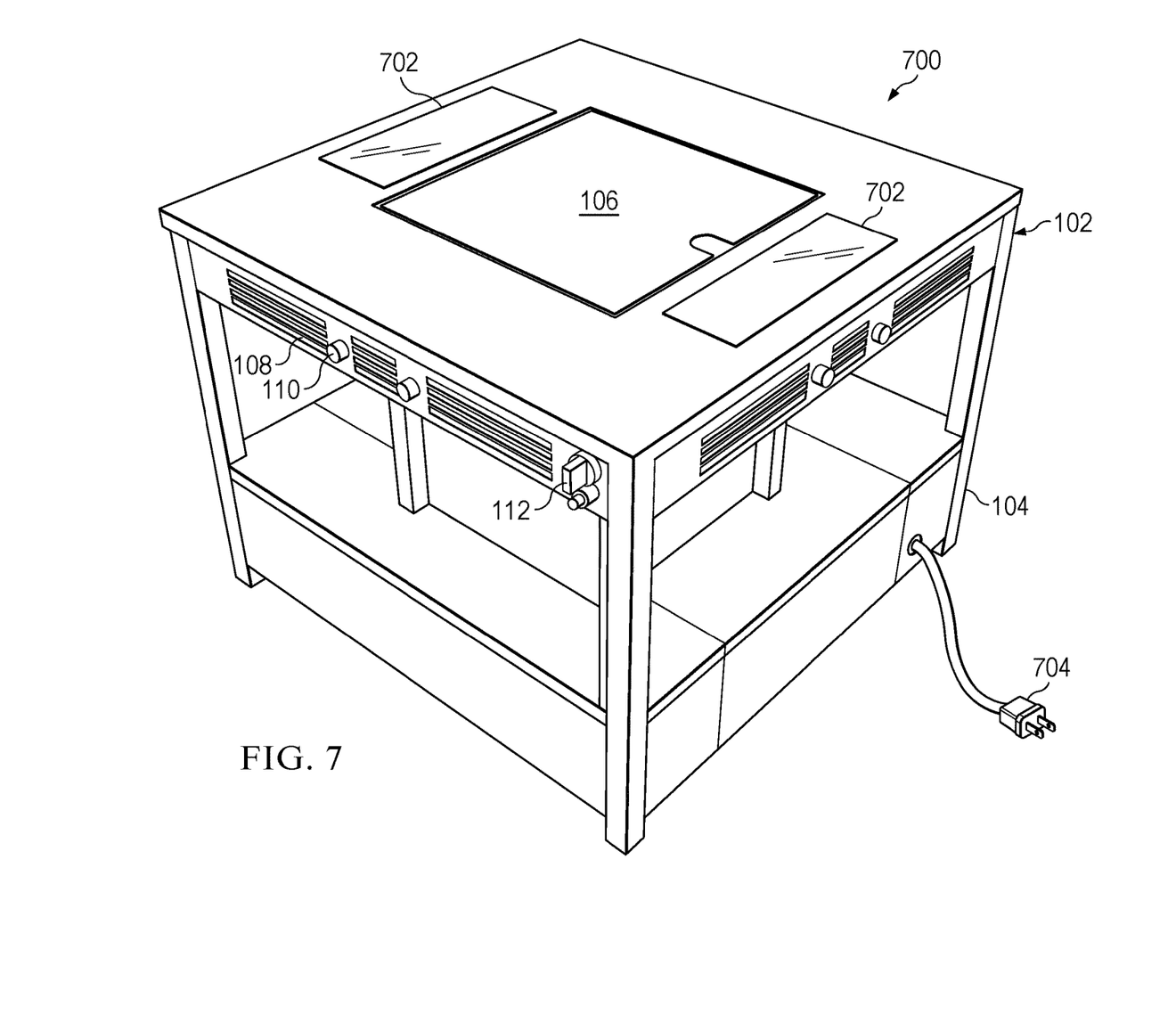
FIG. 7 is a perspective view of another embodiment of a gas fire pit with repellent capabilities according to aspects of the present disclosure.

Referring now to FIG. 7, a perspective view of another embodiment of a gas fire pit 700 with repellent capabilities according to aspects of the present disclosure is shown. The gas fire pit 700 shares many components with the fire pit 100 discussed above. However, the fire pit 700, in addition to options for heating and dispersing repellent based on energy from an internal propane or gas cylinder, also has various other mechanisms for powering an internal heater and/or fan for dispersing repellent via vents 108 or otherwise.

The fire pit 700 may comprise one or more solar panels 702 atop the cabinet 102 or elsewhere such that solar radiation can be used to capture energy. A household plug 704 (e.g., 110 V or 220 V, 60 Hz or otherwise) may also provide energy to the fire pit 700 for heating and/or dispersing repellent.

Figure 8:
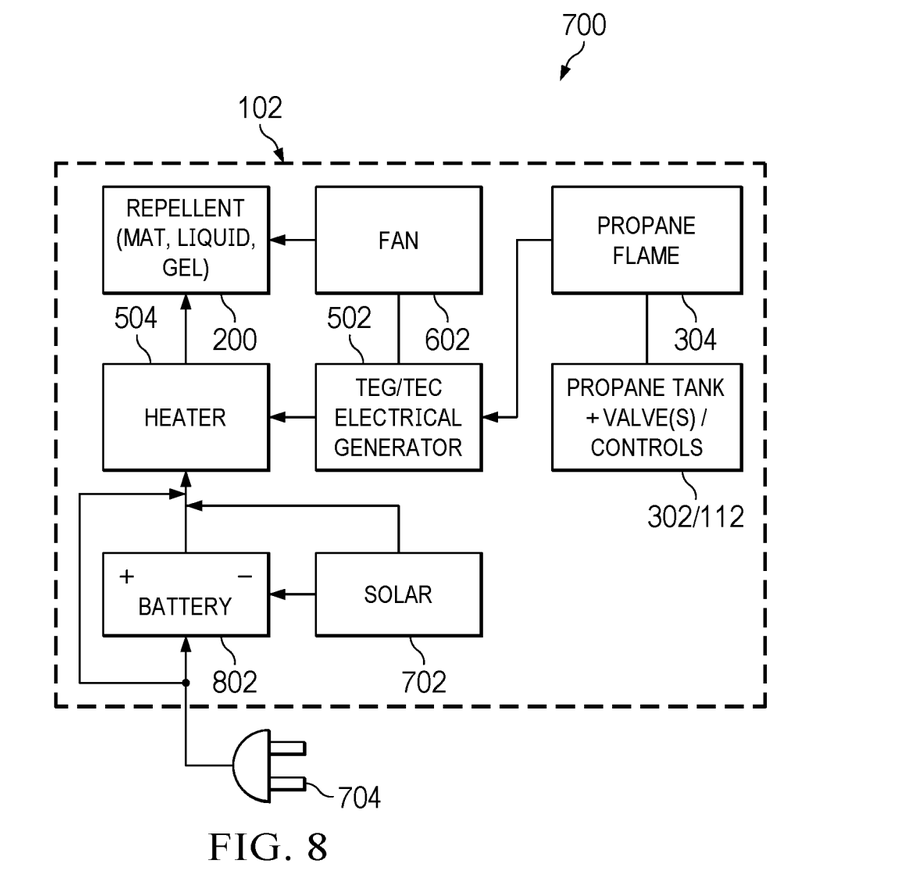
FIG. 8 is a block system diagram of the gas fire pit of FIG. 7.

Referring now to FIG. 8, an exemplary block system diagram of the gas fire pit 700 of FIG. 7 is shown. It should be understood that in the block diagram of FIG. 8, and other block diagrams of the present disclosure, that not every physical lead or connection is shown. Rather, the block diagrams are functional showing flow of energy and/or control. One of skill in the art will readily appreciate numerous specific ways in which details can be implemented using the present disclosure as a plan.

Similar to previous embodiments, the fire pit 700 may include one or more propane tanks and control mechanisms 302/112 that provide combustible fuel to a propane flame or burner 304. Via a thermoelectric generator 502, heat from the propane flame 304 is converted to electrical energy that can be used to power fan 602 and/or heater 504 for dispersing repellent 200. However, in addition to, or in place of, the thermoelectric generator 502, the fire pit 700 may rely on a battery 802 to power the heater 504 and/or fan 602. Another mechanism for powering the fan instead of, or in addition to, any of the above are solar panels 702. In addition to, or instead of battery 802, household power via plug 704 may be used. In some embodiments, one or both of the solar panels 702 and the power plug 704 can be used to recharge battery 802 in addition to, or instead of, powering the heater 504 and the fan 602 directly.

Figure 9:
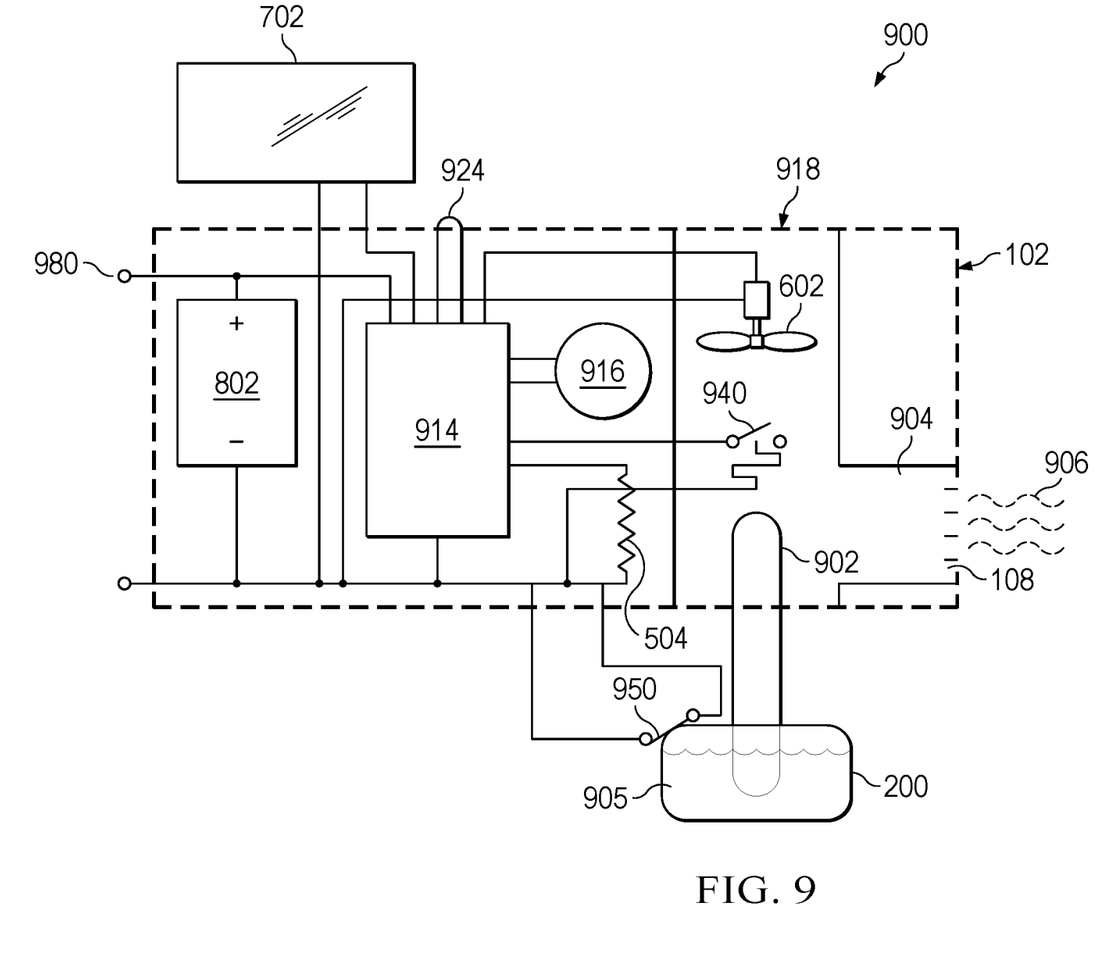
FIG. 9 is a simplified schematic diagram of an insect repellent dispenser mechanism for use with embodiments of the present disclosure.

Referring now to FIG. 9, a simplified schematic diagram of an insect repellent dispenser mechanism 900 for use with embodiments of the present disclosure is shown. The schematic diagram of FIG. 9 is simplified to highlight certain features of various embodiments of an insect repellent dispenser mechanism that may be employed or implemented in various embodiments of a gas fire pit with insect repellent capabilities of the present disclosure. One of skill in the art will readily and easily appreciate any additional needed components needed to realize the repellent devices, systems, and methods of the present disclosure in practice.

A repellent reservoir 200 containing a repellent 905 can be seen to be affixed on or onto the cabinet 102 in a manner such that an associated wick 902 is exposed in an internal air passage 518 allowing air to circulate on and around the wick 902 allowing for volatilization of the repellent 905 from the reservoir 200. Vaporized repellent 906 is shown escaping from vent 108 (though it should be understood that the repellent 906 may escape from a plurality of such vents 108 and/or via a plurality of air passages).

The heater 504 may comprise one or more resistive heating elements or other heating mechanisms. The heater 504 may have a ceramic or other coating. The heater 504 may be placed in proximity to the wick 902 to raise the temperature of the repellent 906 within the wick 902 allowing it to vaporize or volatilize.

A control circuit 914 may provide a number of functions within the device 900 including activation and deactivation of the heater 504. In some embodiments, the control circuit 914 comprises analog components but it may also comprise a silicon based digital controller. One of skill in the art will appreciate multiple ways to use a control circuit to implement the functions of the device 900 or others of the present disclosure.

In some embodiment, a temperature probe 916 is used by the controller 914 to determine when the heater 504 should be activated (e.g., only in certain temperature ranges). In other embodiments, a thermostatic switch 940 near the wick 902 and/or heater 504 may be used to power on the device control circuit 914 and/or the heater 504. As shown, the thermostatic switch 940 powers the control circuit 914, which turns on the heater 504. However, some embodiments are further simplified such that the thermostatic switch 940 controls substantially all operation and the control circuit 914 may be substantially simplified or eliminated.

In some embodiments, a contact switch 950 activates the heater 504 and/or control circuit 914 when the reservoir 200 is attached to the cabinet 102 or a receptacle therein. In some embodiments, the control circuit 914 is simplified or eliminated such that the contact switch 950 activates the heater 504 any time the reservoir 200 is attached to the cabinet 102 or receptacle.

Some embodiments have an on/off button or switch 924 connected to the control circuit 914 (if present). In some cases, the switch 924 simply connects or disconnects power from the entire internal circuit of the repellent device 900 (e.g., serving a as master switch).

As discussed above, devices of the present disclosure may be powered by solar and/or battery. As shown in FIG. 5, the repellent dispenser mechanism 900 has both solar power from solar panel 702 and battery power from internal battery 802. The battery 802 may be rechargeable and may comprise any suitable chemistry. The battery 802 may be user replaceable.

A power connection 980 may be connected to household power and/or power from a thermoelectric generator. In some embodiments, all power, from connection 980 or otherwise, may connect directly to the heater 504 and/or via to the control circuit 914. Control via control circuit 914 may allow for additional function beyond that available by on/off switches, thermostats, or contact switches, or it may simply reduce parts and complexity.

As shown, the control circuit 914 may operate the heater 504 using any power source available to the repellent device 100. Additionally, the control circuit 914 may allow for charging of the battery 802 via solar power or otherwise. In some cases, the control circuit operates one or more status indicators (not shown) such as LED indicator lights, beepers, buzzers etc. These may provide visual or audible indication to the user that the device is powered on and operating as desired, for example.

Figure 10:
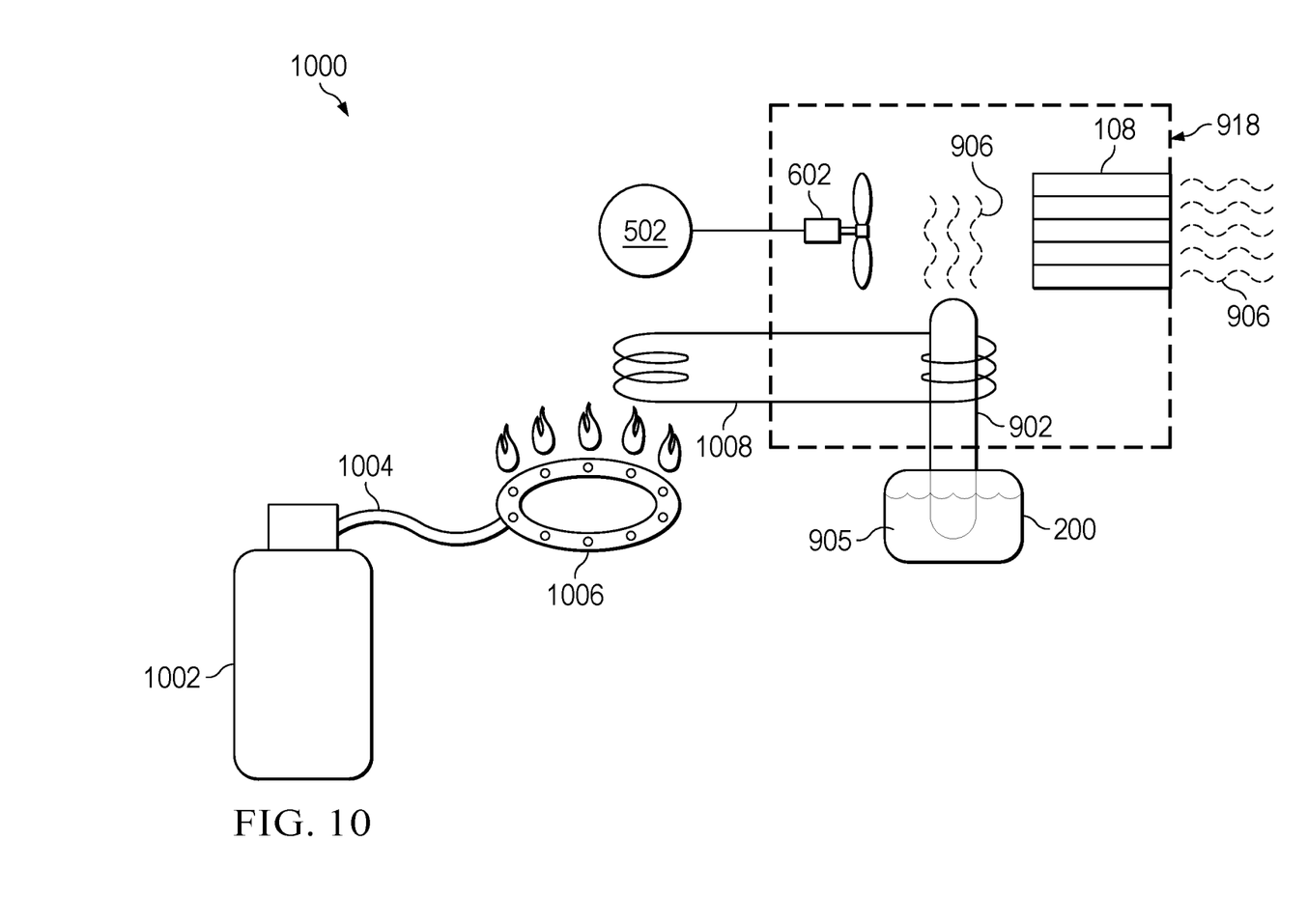
FIG. 10 is a simplified functional diagram of another insect repellent mechanism for use with embodiments of the present disclosure.

Referring now to FIG. 10, a simplified functional diagram of another insect repellent mechanism 1000 for use with embodiments of the present disclosure is shown. Here again, the dispenser mechanism 1000 may be used with various embodiments of fire pits with insect repellent capabilities of the present disclosure. For simplicity, not all components that may be present in a complete physical system are shown. One of skill in the art would readily appreciate how to construct a system according to the present disclosure utilizing the instant drawings and specification. Additionally, components shown may not appear physically as they do in the drawing and are not to scale.

Where propane is used as a heat source for dispensing repellent, a propane bottle or container 1002 may be provided providing fuel to a burner 1006 via connection 1004. Regulators and control valves are not shown. The burner 1006 may provide heat energy to a heat exchanger or heat pipe 1008 that transports heat from the burner 1006 to an area near the wick 902. Heat applied to or placed near the wick 902 will tend to vaporize the repellent 905 drawn into the wick 902. Vaporized repellent 906 may be allowed to drift out of passage 918 via vents 108. In other embodiments, fan 602 may provide positive pressure to disperse the vaporized repellent 906. A thermoelectric generator 502 may be placed near the burner 1006 and thereby provide power for the fan 602 and/or other electrical components.

It will be appreciated that the systems and components of the present disclosure are amenable to many different variations and embodiments. Without limitation, embodiments may include a propane fire pit with heat exchanger and gel pod. Other embodiments may include a propane fire with an auxiliary burner, heat exchanger and gel pod. Other embodiments may include a propane fire pit with catalytic burner/exchanger and gel pod. Other embodiments may include a propane fire pit with a thermoelectric generator and electric heater. Any embodiment may utilize a fan where electricity is provided internally or externally. Liquid pod and/or a dispersion mat may be used in any of these embodiments instead of or in addition to the gel pod. Multiple liquid pods, gel pods, and/or mats or combinations of these may be utilized in any embodiment.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)—(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A fire pit comprising:
   a gas burner;
   a repellent container;
   a thermoelectric generator; and
   a resistive heater;
   wherein the gas burner provides energy that volatilizes repellent from the repellent container;
   wherein the thermoelectric generator generates electric power by exposure to the gas burner; and
   wherein the electric power from the thermoelectric generator powers the resistive heater to disperse the repellent.

2. The fire pit of claim 1, wherein the gas burner volatilizes the repellent by direct heating.

3. The fire pit of claim 1, further comprising a heat pipe that moves heat from the burner to the repellent to volatilize the repellent.

4. The fire pit of claim 1, further comprising a cabinet having an air passage therein that receives the volatilized repellent from the container for dispersal by the fan.

5. A fire pit comprising:
   a gas burner; and
   a repellent container;
   a thermoelectric generator;
   a resistive heater; and
   a fan;
   wherein:
      the gas burner provides energy that volatilizes repellent from the repellent container the thermoelectric generator generates electric power by exposure to the gas burner;
      the electric power from the thermoelectric generator powers the resistive heater to disperse the repellent; and
      the fan is powered by the thermoelectric generator to disperse the volatilized repellent.

6. The fire pit of claim 5, wherein the gas burner volatilizes the repellent by direct heating.

7. The fire pit of claim 5, further comprising a heat pipe that moves heat from the burner to the repellent to volatilize the repellent.

8. The fire pit of claim 5, further comprising a cabinet having an air passage therein that receives the volatilized repellent from the container for dispersal by the fan.

* * * * *